United States Patent
Boeckh et al.

[11] Patent Number: 5,273,676
[45] Date of Patent: Dec. 28, 1993

[54] COPOLYMERS WITH MONOMERS CONTAINING POLYALKYLENE OXIDE BLOCKS, PREPARATION THEREOF AND USE THEREOF

[75] Inventors: Dieter Boeckh, Limburgerhof; Hans-Peter Seelmann-Eggebert, Schriesheim; Heinrich Hartmann, Limburgerhof; Alexander Kud, Eppelsheim; Wolfgang Trieselt, Ludwigshafen, all of Fed. Rep. of Germany

[73] Assignee: BASF Aktiengesellschaft, Ludwigshafen, Fed. Rep. of Germany

[21] Appl. No.: 768,203

[22] PCT Filed: May 4, 1990

[86] PCT No.: PCT/EP90/00720

§ 371 Date: Oct. 24, 1991

§ 102(e) Date: Oct. 24, 1991

[87] PCT Pub. No.: WO90/13581

PCT Pub. Date: Nov. 15, 1990

[30] Foreign Application Priority Data

May 9, 1989 [DE] Fed. Rep. of Germany ....... 3915070

[51] Int. Cl.⁵ .................. C11D 1/83; C11D 1/835; C08F 2/06; C08F 218/08; C08F 220/14
[52] U.S. Cl. .............. 252/174.21; 526/206; 526/216; 526/236; 526/329.7; 526/330; 252/DIG. 2; 252/174.23
[58] Field of Search ............... 526/216; 252/174.21

[56] References Cited

U.S. PATENT DOCUMENTS

| | | | |
|---|---|---|---|
| 4,163,092 | 7/1979 | Steckler | 526/292 |
| 4,351,922 | 9/1982 | Yoshida et al. | 525/116 |
| 4,740,546 | 4/1988 | Masuda et al. | 524/315 |
| 4,746,456 | 5/1988 | Kud et al. | 252/174.24 |
| 4,846,994 | 7/1989 | Kud et al. | 252/174.21 |
| 4,846,995 | 7/1989 | Kud et al. | |

FOREIGN PATENT DOCUMENTS

| | | |
|---|---|---|
| 0157928 | 10/1985 | European Pat. Off. |
| 3636429 | 8/1987 | Fed. Rep. of Germany |
| 1164361 | 9/1969 | United Kingdom |

*Primary Examiner*—Joseph L. Schofer
*Assistant Examiner*—Wu C. Cheng
*Attorney, Agent, or Firm*—Oblon, Spivak, McClelland, Maier & Neustadt

[57] ABSTRACT

Copolymers useful in amounts of from 0.1 to 15% by weight as grayness inhibiting and primary detergency boosting additives in pulverulent liquid detergents have K values of from 10 to 80 (determined by Fikentscher in dimethylformamide at 25° C. with a polymer concentration of 2% by weight) and are obtainable by copolymerizing monomer mixtures of (a) from 10 to 60% by weight of water-soluble monomers obtainable from (A) water-soluble polyalkylene glycols or (B) water-soluble alkoxylated $C_1$-$C_{25}$-alcohols, for example by esterification with $C_3$-$C_6$-carboxylic acids, by vinylation with acetylene or by allylation with alkenyl ethers, or by reaction with ammonia to give the corresponding end group aminated compounds (A) or (B) and by reaction with monoethylenically unsaturated $C_3$-$C_6$-carboxylic acids to form the amides, and (b) from 40 to 90% by weight of vinyl esters of saturated monocarboxylic acids and/or alkyl esters of monoethylenically unsaturated $C_3$-$C_6$-monocarboxylic acids at up to 160° C. in inert solvents in the presence of from 0.1 to 5% by weight, based on the monomers, of polymerization initiators, and, if the amount of initiator is less than 2% by weight, additionally in the presence of polymerization regulators.

8 Claims, No Drawings

COPOLYMERS WITH MONOMERS CONTAINING POLYALKYLENE OXIDE BLOCKS, PREPARATION THEREOF AND USE THEREOF

GB-B-1 164 361 discloses aqueous emulsions of copolymers of vinyl esters and esters of polyalkylene glycols with ethylenically unsaturated carboxylic acids. The polyalkylene oxide blocks on which these esters are based contain from at least 3 to 25 alkylene oxide units. The copolymers are prepared by copolymerizing the monomers in the form of an aqueous emulsion in the presence of 0.4% by weight, based on the monomers, of polymerization initiators. The copolymers have a relatively high molecular weight. They are used in the form of aqueous latices in architectural coatings and adhesives.

Monomers which in addition to at least 2 ethylenically unsaturated double bonds contain a polyalkylene oxide block in the molecule, e.g. the diesters of a polyethylene glycol of more than 10 ethylene oxide units with acrylic or methacrylic acid, are used according to U.S. Pat. Nos. 4,351,922 and 4,163,092 as crosslinkers in the preparation of water-absorbent polymers. However, the resulting copolymers are insoluble in water and alcohols.

U.S. Pat. No. 4,746,456 discloses detergents based on surface-active agents, builders, bleaching agents and customary additives that contain as a grayness inhibitor from 0.1 to 3% by weight of a graft polymer obtainable by grafting polyalkylene oxides of molecular weight 2,000-100,000 with vinyl acetate in a weight ratio of from 1:0.2 to 1:10.

DE-A-3 711 298 discloses using graft polymers obtainable by grafting at least singly end group capped polyalkylene oxides of molecular weight of 300-100,000 based on ethylene oxide, propylene oxide and/or butylene oxide with at least one vinyl ester derived from a saturated monocarboxylic acid of from 1 to 6 carbon atoms and/or a methyl or ethyl ester of acrylic or methacrylic acid in a weight ratio of from 1:0.2 to 1:10, as grayness inhibitors in the wash and aftertreatment of synthetic fiber textile material.

According to DE-A-3 711 319, graft polymers obtainable by grafting polyalkylene oxides with at least one vinyl ester derived from a saturated monocarboxylic acid of from 3 to 6 carbon atoms, methyl or ethyl (meth)acrylate, or mixtures of one of said monomers and up to 95% by weight of vinyl acetate, are used as grayness inhibitors in the washing and aftertreatment of synthetic fiber textile material.

It is an object of the present invention to provide novel substances which are suitable for use as effective detergent additives and which, compared with known polymeric ingredients, shall ideally have better properties.

We have found that this object is achieved by copolymers which have K values of from 10 to 80 (determined by the method of Fikentscher in dimethylformamide at 25° C. with a polymer concentration of 2% by weight) and which are obtainable by copolymerizing monomer mixtures of a) from 10 to 60% by weight of a water-soluble monomer preparable from (A) a water-soluble polyalkylene glycol or water-soluble alkoxylation product of a polyhydric alcohol of a molecular weight of from 458 to 15,000 or (B) a water-soluble alkoxylated monohydric $C_1$-$C_{25}$-alcohol having a molecular weight of up to 5,000 by subjecting compound (A) or (B) to
(1) an esterification with a monoethylenically unsaturated $C_3$-$C_6$-carboxylic acid,
(2) a reaction with ammonia to form the corresponding end group aminated compound (A) or (B) which is reacted with a monoethylenically unsaturated $C_3$-$C_6$-carboxylic acid to prepare the corresponding carboxamide,
(3) a vinylation with acetylene, or
(4) an etherification with a monoethylenically unsaturated $C_3$-$C_{10}$-alkenyl halide, and b) from 40 to 90% by weight of a vinyl ester of saturated $C_1$-$C_8$-monocarboxylic acid or a $C_1$-$C_8$-alkyl ester of monoethylenically unsaturated $C_3$-$C_6$-monocarboxylic acid at up to 160° C. in an inert solvent in the presence of from 0.1 to 5% by weight, based on the monomers, of a polymerization initiator, and, if the amount of initiator is less than 2% by weight, additionally in the presence of a polymerization regulator.

The copolymers are used as detergent additives in amounts of from 0.1 to 10% by weight, based on the detergent formulation. In detergent formulations they act as grayness inhibitors in the washing of textile material based on polyester or polyester-cotton, and also increase the primary detergency.

The above-described isopropanol-soluble copolymers are prepared by copolymerizing monomers of groups (a) and (b). As monomers of group (a) it is possible to use ethylenically unsaturated monomers which in each molecule contain polyalkylene epoxide blocks and one or more monoethylenically unsaturated groups each bonded to the polyalkylene oxide blocks via an ester, amide or ether function. The polyalkylene oxide structure of the monomers of group (a) is derived from water-soluble polyalkylene glycols having a molecular weight of from 458 to 15,000, preferably from 722 to 10,000. The polyalkylene glycols are prepared by polymerizing ethylene oxide, propylene oxide or butylene oxide. They can be polyalkylene oxide blocks formed from a single alkylene oxide only or from mixtures of 2 or 3 different alkylene oxides. In the case of copolymers, alkylene oxides can be present in the polyalkylene oxide structures of monomers (a) in random form or as blocks. The preferred polyalkylene glycols (A) for preparing the monomers of group (a) are polyethylene glycols having a molecular weight of from 1,000 to 6,000, in particular 1,500 to 4,000.

As component (A) for preparing the monomers (a) it is also possible to use the water-soluble alkoxylation products of polyhydric alcohols such as glycerol, sorbitol or mannitol. Suitable alkoxylation products have a molecular weight of from 532 to 15,000, preferably from 796 to 6,000.

To prepare the monomers of group (a) it is also possible to use those polyalkylene oxide blocks which are obtainable by alkoxylation of monohydric $C_1$-$C_{25}$-alcohols with ethylene oxide, propylene oxide and/or butylene oxide. The thus obtainable polyalkylene oxide structures (B) have molecular weights of up to 5,000. Suitable alcohols for reaction with the alkylene oxides mentioned are for example methanol, ethanol, n-propanol, isopropanol, n-butanol, isobutanol, tert-butanol, 2-ethylhexyl alcohols, n-octanol, n-decanol, palmityl alcohol, technical grade cocoa fat alcohol, technical grade $C_{13}$-$C_{15}$ oxo alcohol, technical grade Ziegler alcohol, for example $C_{12}$-$C_{14}$ tallow fat alcohol, and stearyl alcohol. The alkoxylation can be carried out with a single alkylene oxide, preferably ethylene oxide, or with a mixture of ethylene oxide and propylene oxide, in which case a random addition of propylene oxide and ethylene oxide to the alcohols is obtained. It is similarly possible to use block polymers of alkoxylated alcohols as compounds (B).

To prepare the monomers (a), the compounds (A) or (B) are esterified. Group (1) of monomers (a) is obtainable for example by esterifying compounds (A) or (B) with monoethylenically unsaturated $C_3$–$C_6$-carboxylic acids. Preferably, the esterification of the monomers of group (A) is complete; that is, the terminal OH groups of the polyalkylene glcyols are esterified to 100%, so that the resulting monomers (a) contain 2 ethylenically unsaturated double bonds per molecule. The compounds (B) contain only one terminal OH group, which is likewise completely esterified. The monomers then contain only one ethylenically unsaturated double bond.

Group (2) of monomers (a) is obtainable for example by first reacting the compounds (A) or (B) with ammonia to give the corresponding end group aminated $\alpha,\omega$-diamines of compounds (A) or monoamines (B). The amines are then reacted with monoethylenically unsaturated $C_3$–$C_6$-carboxylic acids, esters or chlorides to convert them into the corresponding carboxamides. This reaction is carried out in such a way that the aminated compounds (A) are converted into the corresponding carboxylic diamides while the aminated compounds (B) are converted to the monoamides. The amide formation with carboxylic acids is generally effected at elevated temperatures, for example within the range from 100° to 200° C., with elimination of water.

Group (3) of monomers (a) is obtainable for example by vinylating the compounds (A) or (B) with acetylene. This reaction gives rise to the divinyl ethers of compounds (A) and vinyl ethers of compounds (B), in each case with vinylation of the terminal OH groups of compounds (A) and (B).

Group (4) of monomers (a) is obtainable for example by reacting monoethylenically unsaturated $C_3$–$C_{10}$-alkenyl halides, in particular the chlorides and bromides, with compounds (A) and (B). The reaction with compounds (A) gives $\alpha,\omega$-diallyl ethers, while reaction with compounds (B) gives monoallyl ethers.

Suitable monoethylenically unsaturated $C_3$–$C_6$-carboxylic acids are for example acrylic acid, methacrylic acid, vinylacetic acid, allylacetic acid, propylideneacetic acid, ethylideneacetic acid, crotonic acid, $\alpha,\beta$-ethylacrylic acid, $\alpha,\beta$-dimethylacrylic acid, maleic acid, itaconic acid and fumaric acid. The esterification of compounds (A) and (B) can of course also be carried out with the corresponding anhydrides of monoethylenically unsaturated $C_3$–$C_6$-carboxylic acids, for example with acrylic anhydride, methacrylic anhydride, maleic anhydride or itaconic anhydride.

The preferred monomers of component (a) are the diacrylates and maleates of polyethylene glycols of molecular weight 1,000–6,000, in particular 1,500–4,000. The monomers of group (a) account for 10–60, preferably 20–50, % by weight of the structure of the water-soluble copolymers.

Suitable monomers of (b) are vinyl esters and alkyl esters of monoethylenically unsaturated $C_3$–$C_6$-monocarboxylic acids. Suitable vinyl esters are for example vinyl formate, vinyl acetate, vinyl propionate, vinyl butyrate and vinyl isobutyrate. $C_1$–$C_8$-alkyl esters of monoethylenically unsaturated $C_3$–$C_6$-monocarboxylic acids are for example methyl acrylate, ethyl acrylate, isopropyl acrylate, butyl acrylate, methyl methacrylate, ethyl methacrylate, propyl acrylate, butyl acrylate, 2-ethylhexyl acrylate and 2-ethylhexyl methacrylate Preferred monomers (b) are vinyl acetate, vinyl propionate and methyl acrylate. It is similarly possible to use mixtures of various monomers of group (b), for example mixtures of vinyl acetate and vinyl propionate or mixtures of vinyl acetate and methyl acrylate. The copolymers contain from 40 to 90, preferably from 50 to 80, % by weight of monomers of group (b) as copolymerized units.

The copolymers of monomers (a) and (b) may be modified by copolymerization with further monomers. Suitable modifying monomers of group (c) are for example ethylene, styrene, $\alpha$-methylstyrene, $C_1$–$C_4$-alkyl vinyl ethers, 1,2-dimethoxyethylene, vinylidene carbonate and vinyl chloride. The monomers of group (c) account for from 0 to 20% by weight of the structure of the copolymers.

The copolymers of monomers (a) and (b) may be modified with monomers of component (d). Monomers of component (d) are acrylic acid, methacrylic acid, crotonic acid, vinylacetic acid, esters of said carboxylic acids with monohydric or polyhydric $C_1$–$C_8$-alcohols, acrylamide, methacrylamide, crotonamide and vinlacetamide, maleic acid, itaconic acid, citaconic acid, the mono- and diesters of said dicarboxylic acids with monohydric or polyhydric $C_1$–$C_8$-alcohols, imdies of the dicarboxylic acids, acrylonitrile, methacrylonitrile, dimethylaminoethyl acrylate, diethylaminoethyl acrylate, diethylaminoethyl methacrylate, N-vinylpyrrolidone, N-vinylformamide, N-vinylimidazole, N-vinylimidazoline, 1-vinyl-2-methyl-2-imidazoline, 2-acrylamido-2-methylpropanesulfonic acid, vinylsulfonic acid, allylsulfonic acid, vinylphosphonic acid and allylphosphonic acid. The monomers of group (d) account for from 0 to 10% by weight of the structure of the copolymers. For the purpose of modifying the copolymers of monomers of groups (a) and (b) they may be used together with the monomers of group (c) or else alone.

The copolymerization takes place in an inert solvent. The concentration of the monomers in the solvent is from 5 to 80, preferably from 10 to 50, % by weight. Suitable inert solvents are for example alcohols; for example, the monomers can be copolymerized in the inert diluting medium in the form of an emulsion polymerization or else in the form of a solution polymerization. The form of polymerization depends on the particular diluting medium used. For instance, in a predominantly aqueous medium the polymerization is carried out for example in the manner of an emulsion polymerization, in which case emulsifiers may be additionally present. The amount of emulsifier is then from 0.05 to 2.5% by weight, based on the monomers used in the polymerization. Suitable emulsifiers for this purpose are for example ethoxylated $C_{10}$–$C_{22}$-alcohols containing from 3 to 25 mol of ethylene oxide per mole of alcohol, fatty alcohol sulfates, fatty alcohol polyglycol ether sulfates, block copolymers of ethylene oxide and propylene oxide and also alkoxylation products of alkylphenols.

The emulsion polymerization can be carried out for example by preemulsifying the monomer (b) in water or adding it to the polymerization batch dissolved in a solvent or else in undiluted form. White dispersions are obtained, which become transparent if the alkylene oxide content of monomer (a) is high. By adding solvents such as isopropanol or propylene glycol to these dispersions it is possible to obtain clear solutions.

The copolymerization can also be carried out in the manner of a solution polymerization. In this case the monomers (a) and (b) are dissolved in a suitable organic solvent. Examples of such solvents are $C_1$-$C_5$-alcohols, such as methanol, ethanol, isopropanol, n-propanol, ethylene glycol, propylene glycol, ethers, such as tetrahydrofuran, dioxane, ethylene glycol dimethyl ether and methyl tert-butyl ether, and also aliphatic ketones, such as acetone, methyl ethyl ketone, diethyl ketone and cyclohexanone. If these solvents are water-miscible, it is of course also possible to use mixtures with water as reaction medium. A preferred embodiment consists in polymerizing in alcohol/water mixtures, for example isopropanol/water or ethanol/water.

All the abovementioned polymerization processes are carried out at polymerization temperatures in the range from 0° to 160° C., preferably from 40° to 150° C. If the polymerization temperature is above the boiling point of the solvent under atmospheric pressure, the copolymerization is carried out in pressure-tight apparatus under superatmospheric pressure.

The polymerization initiators used are preferably water-soluble free radical formers, e.g. hydrogen peroxide, peroxodisulfates and mixtures of hydrogen peroxide and peroxodisulfates. Suitable peroxodisulfates are for example lithium, sodium, potassium and ammonium peroxodisulfates. In the case of mixtures of hydrogen peroxide and peroxodisulfate it is possible to set any desired ratio; preferably the hydrogen peroxide and peroxodisulfate are used in the weight ratio of from 3:1 to 1:3. Mixtures of hydrogen peroxide and sodium peroxodisulfate are preferably used in a weight ratio of 1:1. The above-mentioned water-soluble polymerization initiators may also be used combined with reducing agents, for example iron(II) sulfate, sodium sulfite, sodium bisulfite, sodium dithionite, triethanolamine, sodium hydroxymethanesulfonate and ascorbic acid in the form of redox initiators. Suitable water-soluble organic peroxides are for example acetylacetone peroxide, methyl ethyl ketone peroxide, tert-butyl hydroperoxide and cumene hydroperoxide. Water-soluble organic peroxides may likewise be used together with the above-mentioned reducing agents. Further water-soluble polymerization initiators are azo initiators, for example 2,2'-azobis(2-amidinopropane) dihydrochloride, 2,2'-azobis(N,N'-dimethylene)isobutyramidine dihydrochloride, 2-(carbamoylazo)isobutyronitrile and 4,4'-azobis(4-cyanovaleric acid). The polymerization can also be initiated with water-insoluble initiators, such as dibenzoyl peroxide, dicyclohexyl peroxodicarbonate, tert-butyl perpivalate, tert-butyl per-2-ethylhexanoate, dilauroyl peroxide and azobisisobutyronitrile.

The initiators are used in amounts of from 0.1 to 5, preferably from 0.3 to 1.9, % by weight, based on the sum total of monomers used in the polymerization. The polymerization initiators can be added to the mixture to be polymerized either continuously or batchwise, in the form of solutions and either together with the monomers or separately therefrom.

Copolymers of monomers (a) and (b) are obtained when the polymerization is carried out for example as an emulsion polymerization in an aqueous medium with initiator amounts of at least 2% by weight, based on the monomers used. In those cases where the initiator quantities are less than 2% by weight, based on the monomers used, the polymerization is carried out in the additional presence of polymerization regulators. The polymerization regulators used in this case are secondary alcohols, e.g. isopropanol or isobutanol, which can also be used as inert solvent in the preparation of copolymers of monomers (a) and (b). The secondary alcohols thus perform a dual function in that they act as inert solvent and as polymerization regulator at one and the same time. However, if the polymerization is carried out in water or another nonregulating organic solvent, it is absolutely necessary to employ external polymerization regulators. Suitable polymerization regulators are for example aldehydes of from 1 to 4 carbon atoms, such as formaldehyde, acetaldehyde, propionaldehyde, n-butyraldehyde and isobutyraldehyde, formic acid, ammonium formate, hydroxylammonium salts, in particular hydroxylammonium sulfate, SH-containing compounds such as thioglycolic acid, mercaptoalcohols, such as mercaptoethanol, mercaptopropanol, mercaptobutanols and mercaptohexanol, and also long-chain mercaptans, such as dodecylmercaptan. Preference is given to using potent regulators, such as mercaptoethanol. The amount of polymerization regulator is from 0.1 to 5, preferably from 0.2 to 2% by weight, based on the monomers used in the polymerization. If the amount of polymerization initiator is at least 2% by weight, it is also possible to copolymerize in the absence of polymerization regulators. However, if the molecular weight of the copolymer is to be kept relatively low, an external polymerization regulator may be employed even in such cases.

Preference is given to a solution polymerization where the solvent used is isopropanol, which is also a polymerization regulator. In such cases, the polymerization in the presence of initiator quantities which are below 2% by weight, based on the monomers, likewise leads to isopropanol-soluble copolymers. The polymerization can also be carried out with the aid of photoinitiators by irradiation with UV light.

The copolymers have a relatively low molecular weight, which is characterized with the aid of Fikentscher K values. The K values range from 10 to 80, preferably from 15 to 40 (determined in dimethylformamide at 25° C. with a polymer concentration of 2% by weight). The copolymers are soluble in water-alcohol mixtures and pure alcohols. In isopropanol the solubility of the copolymer is at least for example 50 g per liter The above-described copolymers are used according to the invention in detergents having a reduced phosphate content (which for the purposes of the present invention means a phosphate content of less than 25% by weight of sodium triphosphate) or in phosphate-free detergents. For grayness inhibition in washing, the above-described copolymers are added to commercial detergent formulations in amounts of from 0.1 to 15, preferably from 0.3 to 5, % by weight, based on the detergent formulation. The copolymers can be added to the detergent formulation as granules, as a paste, as a highly viscous mass, as a dispersion or as a solution in a solvent. The copolymers can also be adsorbed on the surface of inert diluents, for example sodium sulfate, or builders (zeolites or bentonites) or on other solid ingredients of the detergent formulation.

Detergent formulations are pulverulent or liquid. Pulverulent detergents may differ in composition by region and according to the specific intended use.

Universal household detergents for drum type washing machines of the type widely used in Europe usually contain from 5 to 10% by weight of anionic surfactants, from 1 to 5% by weight of nonionic surfactants, from 1 to 5% by weight of foam regulators, such as silicone oils or soaps, from 0 to 40% by weight of a water softener, such as sodium carbonate or pentasodium triphosphate, which may be replaced in whole or in part by the compounds of the present invention, from 0 to 30% by weight of an ion exchanger such as zeolite A, from 2 to 7% by weight of sodium silicates as corrosion inhibitors, from 10 to 30% by weight of bleaching agents, such as sodium perborate or sodium percarbonate, from 0 to 5% by weight of bleach activators, such as tetraacetylethylenediamine, pentaacetylglucose, hexaacetylsorbitol or acyloxybenzenesulfonate, stabilizers, such as magnesium silicate or ethylenediaminetetraacetate, grayness inhibitors, such as carboxymethylcellulose, methylalkylcelluloses and hydroxyalkylcelluloses, vinyl acetate-grafted polyglycols, oligomeric and polymeric terephthalic acid/ethylene glycol/polyethylene glycol esters, enzymes, fluorescent whitening agents, scents, fabric softeners, dyes, and diluents.

By contrast, the heavy duty detergents which are widely used in the USA, Japan and neighboring countries in tub type washing machines are usually free of bleaching agents, but on the other hand their anionics content is two to three times higher and they contain more wash alkalis, such as sodium carbonate and sodium silicates (in general up to 25 % by weight) and naturally they also lack the bleach activators and bleach stabilizers. The levels of surfactants and other ingredients can be appreciably higher in the case of detergent concentrates, which are available with little or no diluent.

Detergents for delicate and colored fabrics, wool detergents and hand washing detergents likewise usually contain no bleaching agents and only low levels of alkaline ingredients together with a correspondingly higher surfactant content.

Detergents for the commercial laundry sector are designed for the special conditions of industrial washing (soft water, continuous washing) which make it possible to customize the detergent to the type of article being washed and to the nature of the soil. Combinations are therefore used in which one ingredient predominates or others are completely absent only to be added separately when required. For this reason the surfactants, builders, alkalis and bleaching agents of these detergents vary within wide limits.

Suitable anionic surfactants for the aforementioned pulverulent washing detergents, or washing powders, are for example sodium alkylbenzenesulfonates, fatty alcohol sulfates and fatty alcohol polyglycol ether sulfates. Individual compounds of this type are for example $C_8$–$C_{12}$-alkylbenzenesulfonates, $C_{12}$–$C_{16}$-alkanesulfonates, $C_{12}$–$C_{16}$-alkyl sulfates, $C_{12}$–$C_{16}$-alkyl sulfosuccinates and sulfated ethoxylated $C_{12}$–$C_{16}$-alkanols. Other suitable anionic surfactants are sulfated fatty acid alkanolamines, fatty acid monoglycerides or reaction products of from 1 to 4 mol of ethylene oxide with primary or secondary fatty alcohols or alkylphenols. Further suitable anionic surfactants are fatty acid esters and fatty acid amides of hydroxy- or aminocarboxylic or -sulfonic acids, for example the fatty acid sarcosides, glycolates, lactates, taurides or isethionates. The anionic surfactants can be present in the form of the sodium, potassium and ammonium salts and also as soluble salts of organic bases, such as mono-, di- or triethanolamine or other substituted amines. The group of anionic surfactants also includes the ordinary soaps, i.e. the alkali metal salts of natural fatty acids.

Suitable nonionic surfactants (nonionics) are for example addition products of from 3 to 40, preferably from 4 to 20, mol of ethylene oxide with 1 mol of fatty alcohol, alkylphenol, fatty acid, fatty amine, fatty acid amide or alkanesulfonamide. Of particular importance are the addition products of from 5 to 16 mol of ethylene oxide with coconut or tallow fatty alcohols, with oleyl alcohol or with synthetic alcohols of from 8 to 18, preferably from 12 to 18, carbon atoms, and also with mono- or dialkylphenols having from 6 to 14 carbon atoms in the alkyl moieties. Besides these water-soluble nonionics, however, it is also possible to use water-insoluble or incompletely water-soluble polyglycol ethers having from 1 to 4 ethylene glycol ether moieties in the molecule, in particular if they are used together with water-soluble nonionic or anionic surfactants.

Further usable nonionic surfactants are the water-soluble addition products of ethylene oxide with polypropylene glycol ethers, alkylenediaminopolypropylene glycol and alkylpolypropylene glycols having 1 to 10 carbon atoms in the alkyl chain that contain from 20 to 250 ethylene glycol ether groups and from 10 to 100 propylene glycol ether groups, the polypropylene glycol ether chain acting as hydrophobe.

It is also possible to use nonionic surfactants of the type of the amine oxides or sulfoxides.

The foaming power of the surfactants can be increased or reduced by combining suitable surfactant types. A reduction can also be achieved by adding non-surfactant-like organic substances.

A further important ingredient in detergent formulations is an encrustation inhibitor. Encrustation inhibitors are for example homopolymers of acrylic acid, methacrylic acid and maleic acid or copolymers, for example copolymers of maleic acid and acrylic acid, copolymers of maleic acid and methacrylic acid or copolymers of a) acrylic acid and/or methacrylic acid with b) acrylic esters, methacrylic esters, vinyl esters, allyl esters, itaconic esters, itaconic acid, methylenemalonic acid, methylenemalonic esters, crotonic acid and crotonic esters. It is also possible to use copolymers of olefins and $C_1$–$C_4$-alkyl vinyl ethers. The molecular weight of the homo- and copolymers ranges from 1,000 to 100,000. The encrustation inhibitors are used in detergents in an amount of from 0.5 to 10% by weight, in a non-neutralized form, as an alkali metal or ammonium salt, and also in a partially neutralized form, for example with from 40 to 60% of the carboxyl groups neutralized.

Further possible formulation ingredients of detergents include monomeric, oligomeric and polymeric phosphonates, ether sulfonates based on unsaturated fatty alcohols, e.g. oleyl alcohol ethoxylate butyl ether and alkali metal salts thereof. These substances can be characterized for example with the aid of the formula $RO(CH_2CH_2O)_n$—$C_4H_8$—$SO_3Na$, where n is from 5 to 40 and R is oleyl.

The above-described copolymers can also be used as additives in liquid washing detergents. Liquid detergents contain liquid surfactants or else solid surfactants which are soluble or at least dispersible in the detergent formulation. Suitable surfactants for this purpose are those products which are also used in pulverulent detergents but also liquid polyalkylene oxides or polyalkoxylated compounds. If the copolymers are not directly miscible with the other constituents of the liquid detergent, it is possible to prepare homogeneous mixtures with the aid of a small amount of a solubilizer, for example water or a water-miscible organic solvent, e.g. isopropanol, methanol, ethanol, glycol, diethylene glycol or triethylene glycol or corresponding propylene glycols. The amount of surfactant in liquid detergents is within the range from 4 to 50% by weight, based on the formulation as a whole, since in liquid detergents, too, the proportions of the ingredients vary within wide limits according to regional market conditions or the intended application.

Liquid detergents may contain water in amounts of from 10 to 60, preferably from 20 to 50, % by weight. However, they can also be free of water.

Water-free liquid detergents may also contain suspended or dispersed peroxo compounds for bleaching. Examples of suitable peroxo compounds are sodium perborate, peroxocarboxylic acids and polymers having some peroxo-containing groups. Liquid detergents may also contain hydrotropes. These are compounds such as 1,2-propanediol, cumenesulfonate and toluenesulfonate. If such compounds are used for modifying a liquid detergent, their amount is from 2 to 5% by weight, based on the total weight of the liquid detergent. In many cases an addition of complexing agents has also proved advantageous for modifying pulverulent and liquid detergents. Complexing agents are for example ethylenediaminetetraacetic acid, nitrilotriacetate and isoserinediacetic acid and also phosphonates, such as aminotrismethylenephosphonic acid, hydroxyethanediphosphonic acid, ethylenediaminetetraethylenephosphonic acid and salts thereof. Complexing agents are used in amounts of 0 to 10% by weight, based on the detergent. The detergents may also contain citrates, di- or triethanolamine, or opacifiers, fluorescent whitening agents, enzymes, perfume oils and dyes. These substances, if they are used for modifying a liquid detergent, together account for up to 5% by weight. The detergents are preferably phosphate-free. However, they may also contain phosphates, for example pentasodium triphosphate and/or tetrapotassium pyrophosphate. If phosphates are used, they account for up to 25% by weight of the total formulation of the detergent.

The copolymers are also suitable for use as additives in the aftertreatment of synthetic fiber textile material, for example for producing soil release effects. To this end they are added to the final rinse bath of a washing machine cycle, either together with a customary fabric softener or—if a fabric softener is not desired—alone instead of the fabric softener. The amounts used range from 0.01 to 0.3 g/l of washing liquor. The use of the copolymers in the final rinse bath of a washing machine cycle has the advantage that the laundry of the next washing cycle is stained to a far lesser extent by detached soil particles present in the washing liquor than without the addition of the grayness inhibitor in the preceding wash.

The copolymers of the present invention can also interact with other known detergent additives (for example encrustation inhibititors, grayness inhibitors, clay dispersants and substances which enhance the primary detergency, color transfer inhibitors, bleach activators) in pulverulent and liquid detergents (phosphate-containing and phosphate-free) to create synergistic effects where not only the grayness inhibition but also the effect of the other detergent additive may be enhanced.

In the Examples, the parts and percentages are by weight. The K values of the copolymers were determined by the method of H. Fikentscher, Cellulosechemie, 13 (1932), 58-64, 71-74, in dimethylformamide at 25° C. with a polymer concentration of 2% by weight; $K = k \times 10^3$.

PREPARATION OF COPOLYMERS

General Method of Preparation I

A nitrogen purged 2 l glass reactor equipped with 4 feed vessels and reflux condenser is charged with 766 g of water at 75° C., followed by separate 2 hour feeds, starting at the same time, of the amount of vinyl acetate indicated in Table 1 and a 51.3% strength solution of the acrylate of a polyethylene glycol of molecular weight 1,500 (monomer (a)) in water after a stream of nitrogen has been passed through the monomers for 10 minutes. The amounts of mercaptoethanol and 2,2′-azobis(2-amidinopropane) dihydrochloride indicated in Table 1 are added dropwise as solutions in water in the course of respectively 2 and 2.5 hours. After a further hour at 80° C., the mixture is cooled down and filtered through a 100 μ filter for inspection purposes. Generally, no residue will be found on the filter. To determine the K values, the dispersions are evaporated to constant weight, and the product is dissolved in dimethylformamide in 2% strength.

General Method of Preparation II

A nitrogen purged 2 l glass reactor equipped with 3 feed vessels and reflux condenser is charged with 766 g of water at 75° C. In one of the feed vessels, the tabulated amounts of vinyl ester, 51.3% strength solution of acrylate of polyethylene glycol of molecular weight 1,500 (monomer (a)) in water and 2% by weight (based on the monomers) of an addition product of 25 mol of ethylene oxide with 1 mol of p-isooctylphenol as emulsifier are emulsified by intensive stirring. Nitrogen is passed through the mixture until the addition has ended. The monomer mixture is metered in over 2 hours, as is a solution of the tabulated amount of mercaptoethanol in 47 g of water. Starting at the same time, a solution of 2,2′-azobis(2-amidinopropane) dihydrochloride or hydrogen peroxide is added dropwise over 2.5 hours. If hydrogen peroxide is used as initiator, an equivalent amount of sodium hydroxymethanesulfonate in 20% strength in water is added at the same time. After a further hour at 80° C., the mixture is cooled down and filtered through a filter for inspection purposes. In general, no residue will be found on the filter. To determine the K values, the solutions were evaporated to constant weight and the product was dissolved in dimethylformamide in 2% strength.

General Method of Preparation III

A nitrogen purged 2 l glass reactor equipped with 3 feed vessels and reflux condenser is charged with 516 g of isopropanol and 250 g of water at 70° C. In one of the feed vessels, the tabulated amounts of methyl acrylate, polyethylene glycol diacrylate (molecular weight of polyethylene glycol $\overline{M}_n = 1,500$) and 100 g of isopropanol are mixed, and a slow stream of nitrogen is passed through the mixture until the addition has ended. The monomer mixture is metered in over 4 hours, as is a solution of the tabulated amount of mercaptoethanol in 95 g of water. Starting at the same time, a solution of 2,2′-azobis(2-amidinopropane) dihydrochloride in water is added dropwise over 4.5 hours. After a further hour at 70° C., the mixture is cooled down and filtered through a filter for inspection purposes. In general, no residue will be found on the filter. To determine the K values, the solutions were evaporated to constant weight and the product was dissolved in dimethylformamide in 2% strength.

General Method of Preparation IV

A nitrogen purged 2 l glass reactor equipped with 3 feed vessels and reflux condenser is charged with 925 g of water at 80° C. In one of the feed vessels, a 50% strength solution of the dimaleate of polyethylene glycols of the molecular weights indicated in Table 3 in water is prepared and the solution is adjusted to pH 7.0 with NaOH. This solution and the monomer b), in a separate feed vessel, are purged with nitrogen for 30 min and then added over 4 hours. Solutions of 2.1 g of 2,2'-azobis(2-amidinopropane) dihydrochloride and also of the amount of mercaptoethanol indicated in Table 3, each in 100 ml of water, are metered in over respectively 4.5 and 4 hours. After a further hour at 80° C., the mixture is cooled down and filtered through a filter for inspection purposes. In general, no residue will be found on the filter. To determine the K values, the solutions were evaporated to constant weight and the product was dissolved in dimethylformamide in 2% strength.

TABLE 3b

| | Copolymer for comparative example | | |
|---|---|---|---|
| No. | $M_n$ (PEG) | Ratio PEG/VAc | K value |
| 18 | 4,000 | 1:2 | 23.9 |

[1] V50 2,2'-Azobis(2-amidinopropane) dihydrochloride
[2] VAc Vinyl acetate
[3] VPr Vinyl propionate
[4] ME Mercaptoethanol
[5] PEG Polyethylene glycol
[6] $M_n$ Number average molecular weight Application Testing The grayness inhibiting effect of the above-specified copolymers was tested as follows: polyester test fabrics were subjected to a series of 3 washes together with a standard soil cloth. The soil cloth is renewed after every wash, and the test fabric becomes more heavily soiled after every wash. The whiteness of the test fabric after the 3rd wash is used to assess the degree of soiling. The values are made reliable by replication and averaging. The photometric measurement of reflectance in % was carried out in the present case with an Elrepho 2000 (Datacolor) at a wavelength of 460 nm (barium primary white standard in accordance with DIN 5033).

Test conditions
Testing apparatus: Launder-O-meter
Water hardness: 3.5 mmol/molar ratio Ca:Mg=4:1

TABLE 1

| | Copolymers by methods I and II | | | | | |
|---|---|---|---|---|---|---|
| No. | Monomer (a) 51.3% strength [g] | Monomer (b) [g] | Initiator [% by wt.] | ME[4] [% by wt.] | Method | K value of copolymer |
| 1 | 187.1 | VAc[2] 240.0 | V50[1] 0.4 | 0.6 | I | 34.1 |
| 2 | 150.4 | VAc 270.0 | V50 0.4 | 0.5 | I | 34.8 |
| 3 | 253.Z | VAc 229.1 | V50 0.4 | 1.0 | I | 29.9 |
| 4 | 211.0 | VAc 190.9 | V50 0.4 | 1.5 | I | 25.4 |
| 5 | 211.0 | VAc 190.9 | V50 0.4 | 2.0 | I | 22.8 |
| 6 | 232.1 | VAc 180.0 | V50 0.4 | 1.5 | I | 24.7 |
| 7 | 185.7 | VAc 240.0 | $H_2O_2$ 2.0 | — | II | 21.5 |
| 8 | 154.7 | VAc 200.0 | $H_2O_2$ 4.0 | — | II | 16.9 |
| 9 | 193.4 | VPr[3] 200.0 | V50 0.4 | 0.5 | II | 28.8 |
| 10 | 164.4 | VPr 212.5 | V50 0.4 | 0.5 | II | 29.2 |

TABLE 2

| | Copolymers by method III | | | | | |
|---|---|---|---|---|---|---|
| No. | Monomer (a) 51.7% strength [g] | Methyl acrylate [g] | Initiator [% by wt.] | Feed time [h] | ME[4] [% by wt.] | K value of copolymer |
| 11 | 232.1 | 180.0 | V50 1.0 | 4.0 | 2.0 | 20.0 |
| 12 | 116.1 | 240.0 | V50 0.4 | 2.0 | 2.0 | 30.2 |
| 13 | 193.4 | 200.0 | V50 1.0 | 3.0 | 2.0 | 16.1 |

TABLE 3a

| | Copolymers by method IV | | | | | |
|---|---|---|---|---|---|---|
| | PEG dimaleate[5] | | VAc | Initiator | ME [% by wt.] | K value of copolymer |
| No. | $M_n$ (PEG) | [g][6] | [g] | [% by wt.] | | |
| 14 | 1,500 | 89.9 | 214.3 | 0.4 | 1.0 | 36.6 |
| 15 | 1,500 | 104.9 | 200.0 | 1.0 | 1.0 | 30.4 |
| 16 | 4,000 | 89.9 | 214.3 | 1.0 | 1.0 | 31.6 |
| 17 | 4,000 | 104.9 | 200.0 | 1.0 | 1.0 | 27.1 |

Liquor quantity: 250 ml
Liquor ratio: 16.6:1
Test temperature: 60° C.
Test duration: 30 minutes (with heating-up time
Detergent concentration: 8 g/l In the Examples, the grayness inhibitor (in-test substance) was in each case added in an amount of 0.3%, based on the test detergent. The test vessels each contained 5 g of polyester test fabric and 10 g of soil cloth. The soil cloth used was the cotton soil cloth from Wäschereiforschungsanstalt Krefeld, specifically WFK 10 D).

The test detergents used had the following compositions:

|  | Detergent | | |
|---|---|---|---|
| Composition | No. 1 [%] | No. 2 [%] | No. 3 [%] |
| C$_{12}$-Alkylbenzenesulfonate | 6.25 | 6.25 | 5.0 |
| Tallow fat alcohol reacted with 7 ethylene oxide | 4.70 | 4.7 | 25.0 |
| Coconut fatty acid | — | — | 10.0 |
| Soap | 2.80 | 2.8 | — |
| Sodium triphosphate | — | 9.25 | — |
| Sodium diphosphate | — | 0.70 | — |
| Sodium orthophosphate | — | 0.05 | — |
| Zeolite A | 25.0 | — | — |
| Sodium carbonate | 12.0 | — | — |
| Magnesium silicate | 1.0 | 1.0 | — |
| Sodium disilicate | 6.0 | 6.0 | — |
| Sodium perborate tetrahydrate | 20.0 | 20.0 | — |
| Carboxymethylcellulose, sodium salt | 0.6 | 0.6 | — |
| In-test substance | 0.3 | 0.3 | 0.3 |
| Sodium sulfate | ad to 100% | ad to 100% | — |
| Water | — | — | ad. to 100% |
| Triethanolamine | — | — | 6 |
| Polypropylene oxide $\overline{M}_n$ = 600 g/mol | — | — | 2 |
| Isopropanol | — | — | 8 |
| Potassium hydroxide | — | — | 1.25 |

TABLE 4

Primary detergency

| Copolymer No. | Reflectance of | |
|---|---|---|
| | WFK fabric [%] 10 D | EMPA 104 |
| Detergent 1 | | |
| 4 | — | 43.3 |
| 5 | — | 44.2 |
| 6 | 68.3 | 41.8 |
| 10 | 69.8 | |
| Detergent 2 | | |
| 3 | 65.8 | |
| 4 | 66.5 | |
| 13 | 67.0 | |

TABLE 5

Comparative examples to examine primary detergency

| Comparative example | Addition of polymer | Reflectance [%] of | |
|---|---|---|---|
| | | WFK 10 D | EMPA 104 |
| Detergent 1 | | | |
| 1 | 18 | 66.8 | 37.1 |
| Detergent 2 | | | |
| 2 | 18 | 65.7 | 50.3 |

TABLE 6

Grayness inhibition soil cloth = WFK 10 D

| Copolymer No. | Reflectance [%] of PES fabric |
|---|---|
| Detergent 1 | |
| 13 | 80.5 |
| 1 | 79.1 |
| 2 | 79.7 |
| Detergent 2 | |
| 3 | 75.8 |
| 4 | 74.7 |
| 6 | 73.1 |
| 13 | 79.8 |
| 16 | 72.7 |
| 15 | 72.1 |
| Detergent 3 | |
| 13 | 75.2 |
| 3 | 74.5 |

TABLE 7

Comparative examples of grayness inhibition soil cloth = WFK 10 D

| Comparative example No. | Copolymer | Reflectance [%] of PES fabric |
|---|---|---|
| | Detergent 1 | |
| 3 | 18 | 75.6 |
| | Detergent 2 | |
| 4 | 18 | 71.3 |
| | Detergent 3 | |
| 5 | 18 | 73.7 |

We claim:

1. A detergent comprising 0.1 to 15% by weight of a grayness inhibiting copolymer having a K value of from 10 to 80 (determined by the method of Fikentscher in dimethylformamide at 25° C. with a polymer concentration of 2% by weight) obtained by copolymerizing a monomer mixture of
    (a) from 20 to 50% by weight of a water-soluble monomer prepared from (A) a water-soluble polyalkylene glycol or water-soluble alkoxylation product of a polyhydric alcohol of a molecular weight of from 458 to 15,000 or (B) a water-soluble alkoxylated monohydric C$_1$-C$_{25}$-alcohol having a molecular weight of up to 5,000 by subjecting compound (A) or (B) to
        (1) an esterification with a monoethylenically unsaturated C$_3$-C$_6$-carboxylic acid,
        (2) a reaction with ammonia to form the corresponding end group aminated compound (A) or (B) which is reacted with a monoethylenically unsaturated C$_3$-C$_6$-carboxylic acid to prepare the corresponding carboxamide,
        (3) a vinylation with acetylene, or
        (4) an etherification with a monoethylenically unsaturated C$_3$-C$_{10}$-alkenyl halide, and
    (b) from 80 to 50% by weight of vinyl acetate, vinyl propionate, methyl acrylate or a mixture thereof at up to 160° C. in an inert solvent in the presence of from 0.1 to 5% by weight, based on the monomers, of a polymerization initiator, and, if the amount of initiator is less than 2% by weight, additionally in the presence of a polymerization regulator selected from the group consisting of the aldehydes of from 1 to 4 carbon atoms, formic acid, ammonium formate, hydroxylammonium salts or SH-containing compounds in an amount of from 0.1 to 5% by weight, based on the monomers used, or in a secondary alcohol as inert solvent and polymerization regulator.

2. A detergent containing at least one copolymer as claimed in claim 1 in an amount of from 0.1 to 10% by weight.

3. A detergent of claim 1 which is phosphate-free.

4. The detergent of claim 1 which is a household detergent comprising from 5 to 10% by weight of an anionic surfactant, from 1 to 5% by weight of a nonionic surfactant, from 1 to 5% by weight of a foam regulator, from 0 to 40% by weight of a water softener, and from 0 to 30% by weight of an ion exchanger.

5. The household detergent of claim 4 further comprising from 10 to 30% by weight bleaching agent and 0 to 5% by weight of bleach activator.

6. The detergent of claim 4 wherein said anionic surfactant is selected from the group consisting of sodium alkylbenzene sulfonates, fatty alcohol sulfates and fatty alcohol polyglycol ether sulfates, sulfated fatty acid alkenolamines, and fatty acid monoglycerides.

7. The detergent of claim 4 wherein the anionic surfactant is a C$_8$-C$_{12}$-alkylbenzene sulfonate.

8. The detergent of claim 4 further comprising 0.5 to 10% by weight incrustation inhibitor.

* * * * *